United States Patent [19]

Wenrick

[11] 4,113,295
[45] Sep. 12, 1978

[54] LONGITUDINALLY CURVED IMPACT RESISTANT TRIM STRIPS

[75] Inventor: Brian A. Wenrick, Dayton, Ohio

[73] Assignee: Protective Treatments, Inc., Dayton, Ohio

[21] Appl. No.: 753,449

[22] Filed: Dec. 22, 1976

[51] Int. Cl.² ............................................. B60R 19/00
[52] U.S. Cl. .................................... 293/71 R; 428/31
[58] Field of Search .......................... 293/1, 62, 71 R; 52/716, 717, 718; 428/157, 174, 177, 187, 31; 114/219

[56] References Cited

U.S. PATENT DOCUMENTS

| | | | |
|---|---|---|---|
| 2,959,146 | 11/1960 | Erkert | 114/219 |
| 3,222,769 | 12/1965 | LePlae | 52/716 X |
| 3,720,567 | 3/1973 | Shanok | 428/31 |
| 3,841,680 | 10/1974 | Muller | 293/1 |
| 3,843,475 | 10/1974 | Kent | 293/1 X |
| 3,897,967 | 8/1975 | Barenyl | 114/219 |
| 3,934,385 | 1/1976 | Paulus et al. | 52/716 X |
| 3,949,697 | 4/1976 | Ueda | 114/219 |

*Primary Examiner*—Trygve M. Blix
*Assistant Examiner*—D. W. Keen

*Attorney, Agent, or Firm*—Dressler, Goldsmith, Clement, Gordon & Shore

[57] ABSTRACT

A laterally bent, impact resistant, reflective trim strip adapted to be longitudinally curved without subsequent wrinkling of the reflective material is formed to include an extrusion comprising a transparent plastic sheath encapsulating a composite metallized strip. This metallized strip has a film of metal sandwiched between and bonded to a layer of high strength and high temperature resistant transparent plastic, such as polyethylene terephthalate, and a layer of opaque plastic, so that the metal film is visible through the front face of the extrusion. The lateral shape of the extrusion provides a central portion lying in one plane and an edge portion lying in another plane so that when the extrusion is longitudinally curved, either the central portion or the edge portion will be placed in compression. The extrusion is modified herein by an elongated compression-resistant element, such as a metal stiffener, which is secured to either the rear face of the central portion or the edge portion, depending on how the extrusion will be curved, to minimize the compressive forces which are imposed upon any portion of the extrusion when the same is curved.

15 Claims, 6 Drawing Figures

U.S. Patent   Sept. 12, 1978   Sheet 1 of 2   4,113,295
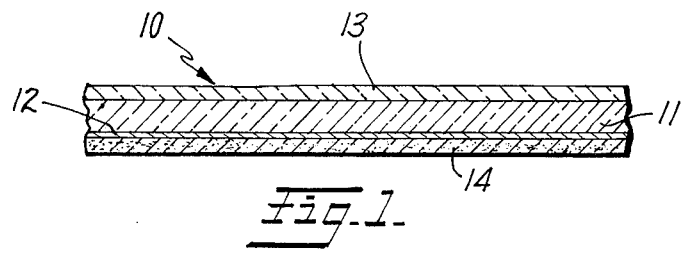
Fig. 1.
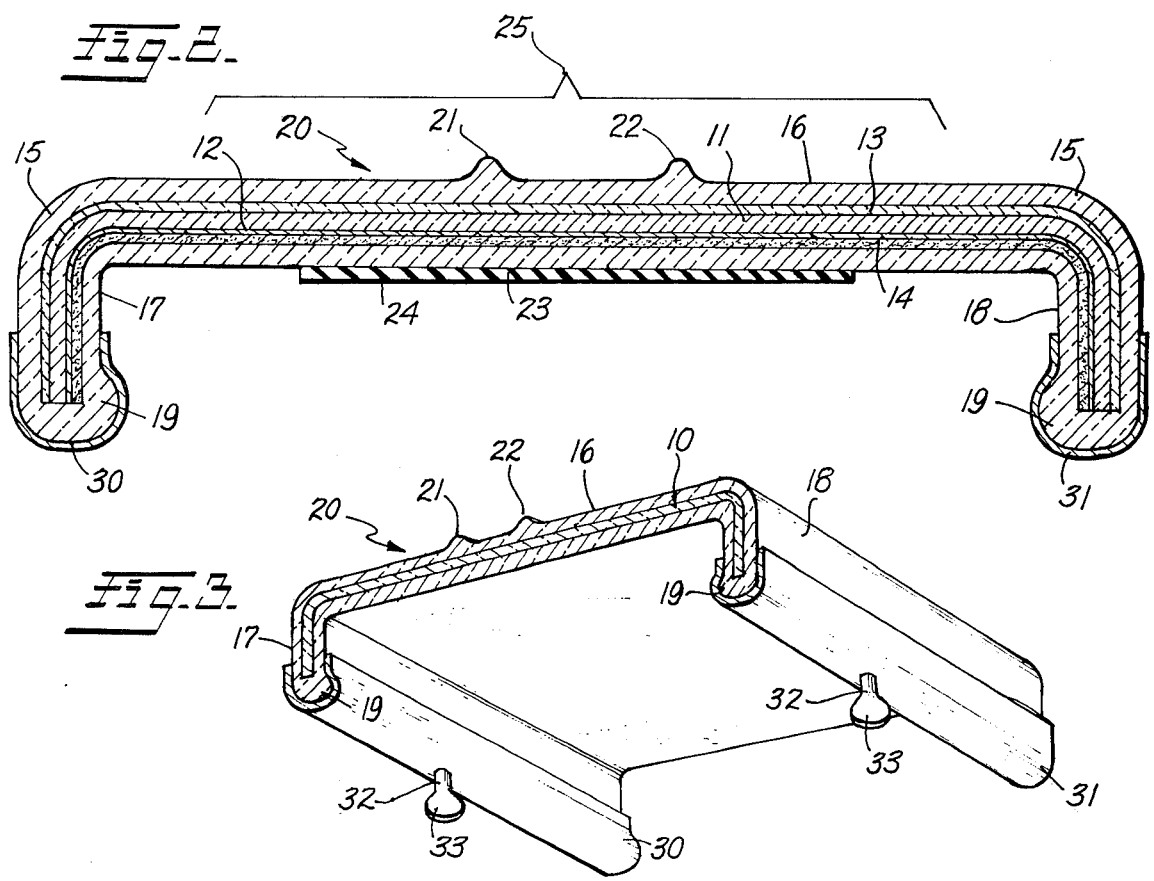
Fig. 2.
Fig. 3.
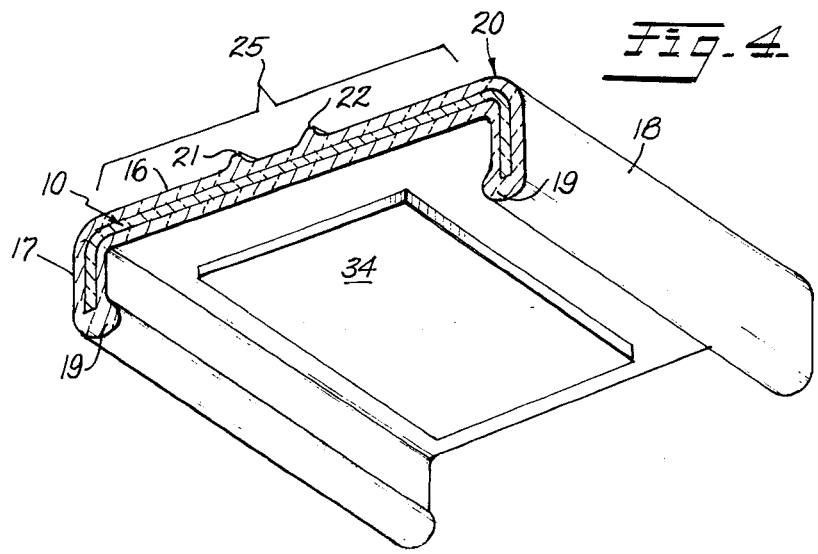
Fig. 4.

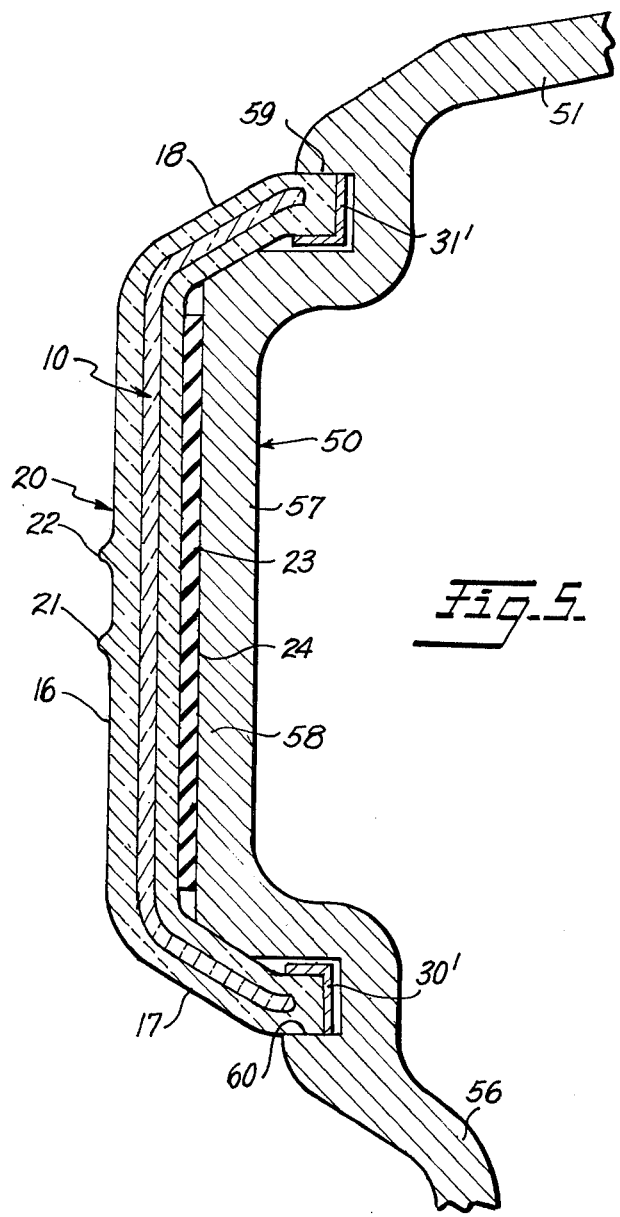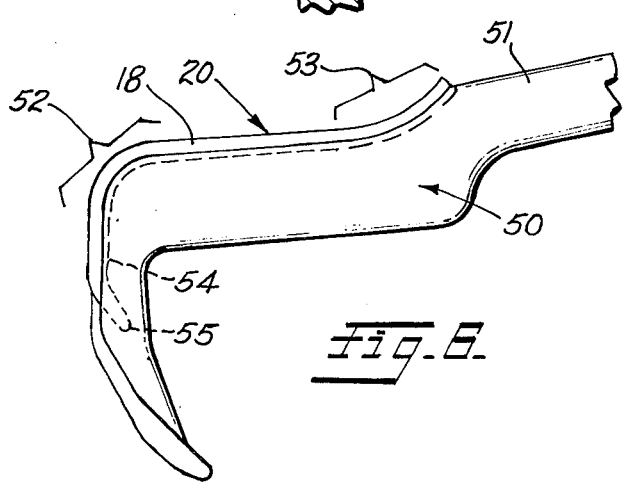

LONGITUDINALLY CURVED IMPACT RESISTANT TRIM STRIPS

The present invention relates to reflective trim strips adapted to be longitudinally bent and secured to a configurated resilient automobile bumper.

Automotive bumpers have traditionally been constituted by metal pieces rendered reflective by chrome plating. These are expensive and heavy and they become permanently distorted on impact. To avoid these difficulties, the art has attempted to employ resilient plastic bumpers but these lack an attractive reflective metallic appearance. Plated metal strips have been secured to these plastic bumpers in an effort to improve their appearance, but these metal strips distort on impact and have other inadequacies.

This invention attempts to utilize, on a resilient automobile bumper, reflective trim strips in which a very thin reflective metal film having no strength of its own is supported by a high tensile strength supporting plastic layer and encapsulated within an extruded plastic sheath. Impact resistant reflective trim strips of the type under consideration are described in the copending application of myself and Harvey E. Svetlik, Ser. No. 719,715 filed Sept. 2, 1976, the disclosure of which is incorporated by reference. Wrinkling problems arise when such trim strips are mounted on configurated resilient automobile bumpers, and this invention is directed to minimizing and even eliminating this wrinkling.

Referring first to the copending disclosure of myself and Harvey E. Svetlik, a longitudinally bendable impact resistant reflective extrusion is provided in which a thin flat metallized strip is encapsulated within a transparent plastic sheath and permanently deformed to a nonplanar shape. The metallized strip has a film of metal with a thickness of less than about 25 microns sandwiched between and bonded to a layer of high strength and high temperature resistant transparent plastic, such as polyethylene terephthalate, having a thickness in excess of 0.001 inch and a layer of opaque plastic. In the form of the invention of interest here, the extrusion is laterally bent to provide a central portion lying in one plane and an edge portion in another plane. Preferably the lateral bending provides a convex cross section and the composite metallized strip is positioned in the sheath so that the metal film is visible from the convex side of the extrusion. Whichever side of the extrusion is reflective is here termed the front face of the extrusion. In preferred practice, the extrusion is laterally formed to a convex shape which provides a generally flat central portion joined to a pair of rearwardly extending flanges.

When these laterally bent extrusions are secured to a configurated bumper, it is necessary for the extrusion to follow the curve of the bumper. These curves are quite sharp in a resilient bumper since the curved configuration strengthens the bumper and provides a decorative appearance.

The longitudinal curve can be in any direction as will be illustrated with an extrusion of convex lateral configuration. First, we have a longitudinally convex curve in which the central face of the extrusion is placed in tension and the rearwardly positioned edges, e.g., the rearwardly extending flanges, are placed in compression. This forces the metal film in the flange to also be placed in compression, and when the stresses in the high strength supporting plastic layer are relieved on exposure to heat, the metal film wrinkles which detracts from it attractive appearance.

Correspondingly, when a longitudinally concave curve is encountered, the central face of the extrusion is placed in compression, and when heat is encountered and tension relieved, the metal film in the central face of the extrusion wrinkles which again detracts from the desired attractive appearance.

This invention is concerned with minimizing the wrinkling problem described above.

Referring first to the convex longitudinal curve which is encountered whenever the laterally convex extrusion goes around either corner of a bumper, this is the more common problem since a bumper will usually wrap around the corner of the vehicle, though it need not have any other longitudinal curves. I have found that if the edges of the extrusion, which are the free ends of the rearwardly extending flanges, are secured to elongated elements which resist compression, then when the extrusion is bent to form a convex curve, the compressive force in the rails is minimized. As a result, the excessive compressive stresses which previously led to wrinkling are avoided, and the increased tensile loading which is imposed on the exposed face of the extrusion does not create a problem.

Turning to the concave longitudinal curves (which may be termed reverse curves) which are encountered when the bumper includes a portion which projects (either forwardly of the front bumper or rearwardly of the rear bumper) further than the rest of the bumper, I have found that if means are provided to prevent the composite metallized layer in the planar exposed portion of the extrusion from being placed in excessive compression, then the wrinkling problem can again be avoided. This may be done by bonding an elongated compression-resistant element, such as a metal stiffener, on the rear face of the central portion of the extrusion. The increased tension imposed on the rail portions of the extrusion is not unduly harmful.

To summarize the perspective of this invention, the reflective metal film is able to sustain considerable tensile loading because it is directly supported by an impact resistant thick high strength layer, but it is not able to sustain significant compressive loading. Be using appropriately placed elements having a greater capacity to resist compression than the body of the extrusion, one can prevent the material of the extrusion in the vicinity of the metal film from being placed in excessive compression where longitudinal curves are encountered.

It is also important to provide adequate securement between the reflective extrusion and the body of the bumper. This can be done using a pressure sensitive adhesive surface on a resilient body which is placed in the space between the rails formed by the concavity of the extrusion. However, and in this invention, it is desired to either supplement or replace the adhesive securement noted above by means of a mechanical attachment between the edges of the extrusion (the free ends of the rails) and the bumper. This mechanical attachment is preferably of a type which permits longitudinal shifting with respect to the bumper when the bumper is impacted. This minimizes stretching of the high tensile strength supporting plastic layer which helps to avoid delamination of the metal film.

Referring more particularly to the details of the reflective extrusion, the thickness of the high tensile strength transparent plastic layer is important to the capacity to resist impact forces and polyethylene terephthalate having a thickness of about 0.002 inch is preferred. Thicker layers can be used in this invention, but there would not normally be any purpose in using a thickness greater than 0.01 inch. When other high tensile strength resins are used in place of polyethylene terephthalate, then the thickness of the layer must be adjusted to provide the same resistance to stress at 12–15% elongation, which is where the bond with the metal film fails.

The metal film is a very thin film, usually of aluminum, which is usually formed by vapor deposition on the polyethylene terephthalate layer. It has a maximum thickness of about 25 microns, with a usual thickness of less than 3 microns. It has little strength of its own.

The metal film is backed up with a coating or lamination of opaque plastic (preferably pigmented polyvinyl chloride) to provide an opaque backing layer for the reflective metal film. It is also helpful to overcoat the polyethylene terephthalate layer with a clear polyvinyl chloride coating since this aids adhesion to the clear plastic sheath which is extruded around the metallized composite. This clear plastic sheath is also preferably constituted by polyvinyl chloride.

The thickness of the sheath is not important, but is usually in the range of about 0.04–0.4 inch, preferably in the range of 0.1–0.3 inch.

It is broadly possible to encapsulate the clear plastic sheath by laminating two layers of clear plastic around the metallized composite, but this is less satisfactory than a hot melt extrusion encapsulation which is more effective in excluding moisture from the metal film, particularly after the extrusion has been subjected to impact.

The invention will be more fully understood in connection with the accompanying drawings in which:

FIG. 1 is a fragmentary cross section, on an enlarged scale, of a composite metallized strip which is useful herein;

FIG. 2 is a cross section, also on an enlarged scale, of a trim strip in accordance with the invention;

FIG. 3 is a perspective view of a trim strip which differs from that of FIG. 2 in that the metal rails carry the means for securing the trim strip to the bumper;

FIG. 4 is a perspective view of a trim strip showing the portion of the strip which it is intended to reversely curve so as to compress the central portion of the extrusion;

FIG. 5 is a partial vertical cross section taken through that portion of a resilient bumper which carries the trim strip of this invention; and FIG. 6 is a top plan view of a portion of a resilient bumper showing the disposition of the trim strip thereon.

Referring more particularly to the drawings, the numeral 10 identifies a composite metallized strip in which a relatively thick high tensile strength supporting layer 11 (preferably polyethylene terephthalate having a thickness of 0.002 inch) has a vapor deposited metal film 12 (preferably aluminum having a thickness of about 2 microns) adhered to one surface thereof. To protect the metal film 12 and also to enhance adhesion to the subsequently applied encapsulating resin, thin plastic coatings 13 and 14 are applied to at least the metallized surface of the supporting layer 11. Layer 14 is pigmented to be opaque, and layer 13 is optional. In the illustrative embodiment shown, layer 13 is clear polyvinyl chloride having a thickness of about 0.001 inch, and layer 14 is black pigmented polyvinyl chloride having a thickness of 0.001 inch, and it is opaque.

The composite metallized strip 10 is advanced through an extruder, as is more fully discussed in the copending application noted hereinbefore, to completely envelope or encase the composite strip within an encapsulating sheath 15, and the extrusion is laterally curved and cooled to provide a permanently deformed extrusion as shown in FIG. 2. Since the final trim strip is to be supported by a resilient bumper, the final trim strip 20 is formed to a convex shape with the metal film being visible from the convex or front side of the product. This provides an exposed metallic appearing surface 16 which would receive any impact, and side flanges 17 and 18. The preferred construction includes longitudinal lenticular elements 21 and 22 which provide the appearance of bends in the exposed surface even though the metal film 12 is flat where these bends seem to be present.

In the form of the invention illustrated in FIG. 2 the flanges 17 and 18 have free ends which are enlarged as indicated at 19 and the enlarged ends 19 are encased in and bonded to metal rails 30 and 31. These metal rails may carry securing elements as will be discussed hereinafter, but this is not essential, and a butyl rubber layer 23 carrying a pressure sensitive surface 24 may be applied to the rear face of the trim strip in order to allow the trim strip to be bonded to a bumper in a longitudinally shiftable manner.

As will be evident from the preceding description, the trim strip shown in FIG. 2 is convexly curved and includes a generally flat central portion 25 lying in one plane, and free ends 19 lying in another plane, so when the trim strip 20 is longitudinally curved, either the central portion 25 or one of the free ends 19 will be placed in compression. In the form shown in FIG. 2, the metal rails 30 and 31 are more compression resistant than the plastic of the extrusion, so when the longitudinal curving tends to place the flanges 17 and 18 in compression, the compressive stress imposed upon these flanges is minimized and correspondingly, the tension on the central portion 25 is greater than it would be if the rails 30 and 31 were not present.

The rails 30 and 31 can be formed of various metals, copper being used as illustrative, and these rails can be applied by bringing them through the extruder, or by clamping them upon the hot extrudate, or by adhesively bonding them to the cooled extruded trim strip.

Referring to FIG. 3, the butyl rubber layer 23 with its pressure sensitive surface 24 has been eliminated, the trim strip 20 being secured to a bumper by means of projecting securing elements (studs 32) which extend rearwardly from the rails 30 and 31. The studs 32 are formed with enlarged heads 33 so they can be slidingly mounted in appropriate grooves in the bumper.

As will be evident, the rails 30 and 31 can run the full length of the trim strip so long as no reverse longitudinal curves are intended, and this is preferred where the rails carry securing studs 32. Where a pressure sensitive securement is intended, it is only necessary to employ the stiffening rails where a longitudinal curve is intended.

FIG. 4 shows that portion of the trim strip 20 where a reverse longitudinal curve is intended. Here, excessive compression of the central portion 25 must be avoided without masking the front reflective face of the trim strip. This is done by bonding an elongated compression-resisting strip 34 to the rear face of the central portion 25 of the trim strip 20. Strip 34 can be of metal (copper) and its rear face can carry a pressure sensitive surface (not shown) for securement to the bumper.

FIG. 6 shows a portion of a resilient bumper 50, namely the left corner of the front bumper, the upper flange 51 being seen. The trim strip 20 conforms with the shape of the bumper, and this necessitates a convexly curved longitudinal portion 52, and a reversely curved longitudinal portion 53. Since this figure is a top plan view, the portion of the trim strip 20 which is visible is the upper flange 18, and a portion of this flange extends into the body of the bumper as noted at 54. One end of the trim strip 20 should be free for longitudinal movement in the event of impact, and here the end 55 of the trim strip simply projects through a hole in the bumper 50 to extend into the hollow interior of the bumper.

The structure of the bumper and the positioning of the trim strip thereon will be better seen from FIG. 5 where it will be seen that the resilient bumper 50 is molded to include an upper flange 51, a lower flange 56 and a central portion 57, the latter including a forwardly projecting portion 58 which enters the rear of the trim strip 20 to support the convexly bent extrusion. In this illustration, the portion 58 engages the adhesive surface 24 of the butyl rubber layer 23.

The projecting portion 58 is flanked with grooves 59 and 60 for receiving the flanges 17 and 18 which are stiffened by metal rails 30 and 31. The specific shaping of the trim strip 20 and the rails 30 and 31 is different in FIG. 5 than it is in the remaining figures to show that these details are not the significant aspects of this invention.

Returning to FIG. 6, the rails 30 and 31 need only be present in the curved area 52 and these rails are replaced by strip 34 in the reversely curved area 53.

To further consider the materials which are useful herein, polyvinyl chloride is of especial value in the present invention, but it can be replaced by other similar resins, such as polyvinylidene chloride, cellulose acetate butyrate, and the like. Cellulose acetate butyrate is harder and stronger so it allows a somewhat thinner layer of polyethylene terephthalate to be used.

The transparent plastic layer on which the metal film is deposited must be very strong for its thickness, and high temperature resistant. Polyethylene terephthalate is outstanding for this utility, but other similar resins, such as polyamides, illustrated by Nylon, may also be used.

Similarly, the butyl rubber material used to carry the pressure-sensitive adhesive surface may be replaced by a resilient material, it being particularly preferred to employ an energy absorbing composition as disclosed in U.S. Pat. No. 3,896,245.

While use on an automobile bumper is primarily contemplated, similar utilites, such as the provision of "rub rails" on marine craft, is also significant.

The invention is defined in the claims which follow.

I claim:

1. A laterally bent, reflective trim strip adapted to be longitudinally curved without subsequent wrinkling of the reflective material comprising, an extrusion comprising a transparent plastic sheath encapsulating a composite metallized strip, said metallized strip having a film of metal sandwiched between and bonded to a layer of high strength and high temperature resistant transparent plastic and a layer of opaque plastic so that the metal film is visible through the front face of said extrusion, said extrusion having a central portion lying in one plane and an edge portion lying in another plane so that when said extrusion is longitudinally curved, either the central portion or the edge portion will be placed in compression, and an elongated compression-resistant element secured to the rear face of said central portion where it is intended to concavely curve said strip and to said edge portion where it is intended to convexly curve said strip to minimize the compressive forces which are imposed upon any portion of the extrusion when the same is longitudinally curved.

2. A trim strip as recited in claim 1 in which said layer of high strength transparent plastic has a thickness of at least 0.001 inch.

3. A trim strip as recited in claim 2 in which said layer of high strength transparent plastic is polyethylene terephthalate.

4. A trim strip as recited in claim 3 in which said polyethylene terephthalate has a thickness of about 0.002 inch.

5. A trim strip as recited in claim 1 in which said layer of high strength transparent plastic has a thickness in the range of 0.001–0.01 inch, and said sheath has a thickness in the range of 0.1–0.3 inch.

6. A trim strip as recited in claim 1 in which said metal film has a thickness of less than about 25 microns.

7. A trim strip as recited in claim 6 in which said layer of high strength transparent plastic is polyethylene terephthalate having a thickness of at least 0.001 inch, said opaque plastic is pigmented polyvinyl chloride, and said transparent sheath is clear polyvinyl chloride having a thickness in the range of 0.04–0.4 inch.

8. A trim strip as recited in claim 7 in which said metal film is vapor deposited aluminum.

9. A trim strip as recited in claim 1 in which said extrusion is laterally bent to a convex shape providing a generally flat central portion joined to a pair of rearwardly extending flanges, the metal film being visible from the convex side of the extrusion, and compression-resistant rails are secured to the edges of said flanges.

10. A trim strip as recited in claim 9 in which said rails are metal rails bonded to said flanges, and said rails include projecting securing elements for securing said trim strip to a bumper.

11. A trim strip as recited in claim 10 in which said securing elements project rearwardly of said trim strip and are formed to enable a longitudinally shiftable securement.

12. A trim strip as recited in claim 9 in which an elongated compression-resistant strip is bonded to the rear face of said flat central portion where it is intended to longitudinally curve the trim strip in a manner placing said central portion in compression.

13. A laterally bent, reflective trim strip adapted to be longitudinally curved without subsequent wrinkling of the reflective material comprising, an extrusion comprising a transparent plastic sheath having a thickness in the range of 0.04–0.4 inch encapsulating a composite metallized strip, said metallized strip having a film of metal having a thickness of less than about 25 microns sandwiched between and bonded to a layer of polyethlene terephthalate having a thickness in the range of 0.001 to 0.01 inch and a layer of opaque plastic so that the metal film is visible through the front face of said extrusion, said extrusion being laterally bent to a convex shape providing a generally flat central portion joined to a pair of rearwardly extending flanges to cause said flat central portion to lie in one plane and the edges of said flanges to lie in another plane so that when said extrusion is convexly longitudinally curved, the edges of the flanges will be placed in compression, and elongated compression-resistant metal rails bonded to the edges of the flanges to minimize the compressive forces which are imposed upon the flanges when the trim strip is convexly longitudinally curved to place said flanges in compression.

14. A trim strip as recited in claim 13 in which said metal rails are present except where it is intended to subject the trim strip to a reverse longitudinal curve, and the portion of the trim strip lacking said rails has an elongated compression-resistant strip bonded to the rear face of said flat central portion.

15. In combination, a resilient bumper which is curved along its length and a laterally bent, reflective trim strip which is longitudinally curved to follow the curve of said bumper secured to said bumper in a manner permitting longitudinal shifting of the trim strip with respect to the bumper when the bumper is impacted, said trim strip comprising an extrusion comprising a transparent plastic sheath encapsulating a composite metallized strip, said metallized strip having a film of metal sandwiched between and bonded to a layer of high strength and high temperature resistant transparent plastic and a layer of opaque plastic so that the metal film is visible through the front face of said extrusion, said extrusion having a central portion lying in one plane and an edge portion lying in another plane so that where said extrusion is longitudinally curved, either the central portion or the edge portion will be placed in compression, and an elongated compression-resistant element secured to the rear face of said central portion where it is intended to concavely curve said strip and to said edge portion where it is intended to convexly curve said strip to minimize the compressive forces which are imposed upon any portion of the extrusion where the same is longitudinally curved, whereby wrinkling of the reflective material in the trim strip is minimized.

* * * * *